United States Patent
Nielsen

(10) Patent No.: US 10,963,770 B2
(45) Date of Patent: Mar. 30, 2021

(54) CIRCUIT LAYER FOR AN INTEGRATED CIRCUIT CARD

(71) Applicant: CARDLAB APS, Herlev (DK)

(72) Inventor: Finn Nielsen, Copenhagen S (DK)

(73) Assignee: CARDLAB APS, Herlev (DK)

( * ) Notice: Subject to any disclaimer, the term of this patent is extended or adjusted under 35 U.S.C. 154(b) by 0 days.

(21) Appl. No.: 16/080,085

(22) PCT Filed: Feb. 28, 2017

(86) PCT No.: PCT/EP2017/054576
§ 371 (c)(1),
(2) Date: Aug. 27, 2018

(87) PCT Pub. No.: WO2017/148901
PCT Pub. Date: Sep. 8, 2017

(65) Prior Publication Data
US 2019/0065922 A1    Feb. 28, 2019

(30) Foreign Application Priority Data
Mar. 1, 2016 (EP) .................................... 16158068

(51) Int. Cl.
*G06K 19/077* (2006.01)

(52) U.S. Cl.
CPC ..... *G06K 19/07743* (2013.01); *G06K 19/077* (2013.01); *G06K 19/07722* (2013.01)

(58) Field of Classification Search
CPC ........ G06K 19/00; G06K 19/04; G06K 19/06; G06K 19/07; G06K 19/067
USPC .................. 235/492, 380, 375, 487
See application file for complete search history.

(56) References Cited

U.S. PATENT DOCUMENTS

| | | | |
|---|---|---|---|
| 4,835,846 A | 6/1989 | Juan et al. | |
| 2005/0217894 A1 | 10/2005 | Pan | |
| 2006/0131691 A1* | 6/2006 | Roozeboom | H01L 21/76898 257/534 |
| 2009/0096076 A1* | 4/2009 | Jung | H01L 25/0657 257/686 |
| 2011/0011939 A1 | 1/2011 | Seah | |
| 2012/0208697 A1* | 8/2012 | Yamaguchi | B41M 5/41 503/201 |
| 2013/0286611 A1* | 10/2013 | Droz | G06K 19/07728 361/760 |

(Continued)

FOREIGN PATENT DOCUMENTS

| RU | 2172017 C2 | 8/2001 |
|---|---|---|
| RU | 2398280 C2 | 8/2010 |
| RU | 2447540 C2 | 4/2012 |

OTHER PUBLICATIONS

PCT Request for EP 16158068.3 Filed Mar. 1, 2016.

(Continued)

*Primary Examiner* — Edwyn Labaze
(74) *Attorney, Agent, or Firm* — Harness, Dickey & Pierce, P.L.C.

(57) ABSTRACT

A circuit layer for an integrated circuit card comprising an electronic circuit embedded in a substrate and a coating covering the substrate and circuit. To enable larger tolerances of the position of the circuit in the substrate, the electronic circuit has contact pads with a quadrangular shape and the contact pads are exposed through the coating by holes having a circular shape.

15 Claims, 3 Drawing Sheets

(56) References Cited

U.S. PATENT DOCUMENTS

| | | | |
|---|---|---|---|
| 2014/0035685 A1* | 2/2014 | Chiba | H03B 1/00 |
| | | | 331/68 |
| 2014/0239474 A1* | 8/2014 | Pueschner | H01L 21/50 |
| | | | 257/690 |
| 2015/0339565 A1* | 11/2015 | Pueschner | G06K 19/07775 |
| | | | 235/488 |
| 2017/0148708 A1* | 5/2017 | Kim | H01L 23/4985 |

OTHER PUBLICATIONS

PCT/IB/304 PCT Notification Concerning Submission, Obtention or Transmittal of Priority Document for International Application No. PCT/EP2017/054576 Filed Feb. 28, 2017.
PCT/IB/306 PCT Notification of the Recording of a Change for International Application No. PCT/EP2017/054576 Filed Feb. 28, 2017.
PCT/IB/308 PCT Second and Supplementary Notice Informing the Applicant of the Communication of the International Application (To Designated Offices Which Apply the 30 Month Time Limit Under Article 22(1)) for International Application No. PCT/EP2017/054576 Filed Feb. 28, 2017.
PCT/ISA/210 PCT International Search Report for International Application No. PCT/EP2017/054576 Filed Feb. 28, 2017.
PCT/ISA/237 PCT Written Opinion of the International Searching Authority for International Application No. PCT/EP2017/054576 Filed Feb. 28, 2017.
Translation of Russian Search Report dated Apr. 27, 2020 for corresponding Russian Application No. 2018133848.

* cited by examiner

CIRCUIT LAYER FOR AN INTEGRATED CIRCUIT CARD

CROSS-REFERENCE TO RELATED APPLICATIONS

This is a national phase of under 35 U.S.C. § 120 to, PCT International Application No. PCT/EP2017/054576, which has a international filing date of Feb. 28, 2017, which claims priority to European Patent Application No.: 16158068.3, filed Mar. 1, 2016 the entire contents of each of which are hereby incorporated by reference.

The invention relates to a circuit layer for an integrated circuit card such as IC card, smart card, chip card, sim card, and other well known cards such as Dynamic MAG-stripe cards and Display Cards etc. The cards typically include a substrate carrying a circuit, e.g. including a chip. The cards are used for various purposes, e.g. for authentication or identification, as payment cards, or generally for secure data exchange. The cards are typically in standard sizes matching a communication slot of a specific electronic device which is supposed to communicate with the card e.g. according to ISO7810 ID-1 format.

Particularly, the invention relates to a circuit layer comprising a substrate with opposing first and second surfaces defining a thickness direction of the circuit layer in a direction perpendicular to the first and second surfaces, an electronic circuit embedded in the substrate and/or assembled on the substrate, and a coating covering the first surface. The electronic circuit comprises a plurality of contact pads exposed on the first surface and the coating forms at least one sector uncovering at least a portion of a corresponding contact pad.

Such cards are used in very high numbers and they are produced in very efficient manufacturing facilities making the costs low. The manufacturing includes a number of process steps and a certain tolerance in x-direction and y-direction is expected. In the following, we refer to this as "index error".

Typically, the substrate with the electronic circuit and the contact pads is made in a first production process by a first machine. Subsequently, the substrate is moved to a second machine and the coating is applied to the first surface.

After the coating is applied, the card is cut into a format suitable for the application e.g. ID-1 format. This process contributes to an increase in the indexing error.

After the coating is solidified and the card is cut into the right format, a machine is applied for uncovering the contact pads to enable contact with the contact pads from outside the circuit layer. The uncovering of the contact pads is often carried out by a cutting process such as by drilling and/or milling into the coating layer to remove the coating at sectors above the contact pads.

Due to the high focus on manufacturing costs, and due to the many subsequent manufacturing steps, it is generally desired to allow an index error in the range of +/−0.4-0.8 mm in x-direction and +/−0.4-0.8 mm in y-direction. In particular when the errors are both in the x-direction and in the y-direction, the total index error increases, and there is a risk that the sectors are offset too far from the contact pads to establish conductivity.

One solution to this problem could be to increase the size of the contact pads. This, however, would lead to another problem related to the size of the card and the need to include many contact pads within a small area. A general change in size may also conflict with standards specifying the position of the contact pads.

Accordingly, there is a conflict between the very small sizes of the circuit cards, the desired low manufacturing costs, and the increasing complexity e.g. with a need for an increasing number of contact pads or an increasing complexity of the card in general.

With focus on the above mentioned problems, embodiments of the invention, in a first aspect, provides a circuit layer wherein the contact pads have a quadrangular shape.

Due to the quadrangular shape of the contact pads, the sectors, which are often circular, will more likely be overlapping a contact pad even when the index error reaches the limits both in the x-direction and in the y-direction. At the same time, the contact pads may be arranged with the same distance to adjacent contact pads and required mutual positions and layout of the contact pads may therefore be preserved. Accordingly, the invention enables larger tolerances without limiting the ability to position the contact pads close to each other.

The substrate may particularly be a sheet of plastic, e.g. polyvinyl chloride, polyethylene terephthalate based polyesters, acrylonitrile butadiene styrene, polycarbonate, polyimide, FR4 or a combination of the mentioned materials, e.g. including a PVC back sheet and a Polyimide PCB layer etc. The substrate and coating may have a thickness, i.e. the dimension in the thickness direction, less than a few millimetres, particularly a thickness in the range of 500-2000 μm or more particularly in the range of 600-1200 μm. The coating may particularly constitute in the range of 40-60 percent of the thickness.

The other dimensions, i.e. the width and length, are herein referred to as the x-dimension and the y-dimension. These are dimensions in the surface of the circuit layer. The x-dimension and y-dimension may be larger than the thickness, e.g. at least 20-100 times larger.

The substrate may, in addition to the electronic circuit, contain different other features, e.g. a magnetically readable label, different kinds of surface structures, e.g. embossed letters or a surface decoration, e.g. including holograms or other features rendering the layer difficult to reproduce.

The electronic circuit may, in addition to the contact pads comprise electronic connectors, processors, finger print readers and other computer related features. By "embedded" is herein meant that the electronic circuit is either moulded into the substrate or affixed to a surface of the substrate, typically the first surface which is subsequently coated.

The first and second surfaces may particularly be parallel to each other.

The contact pads are exposed on the first surface and they may extend upwards from the first surface. The contact pads thereby forms a three-dimensional structure with a base at the first surface and body extending upwards towards a top where the contact pad has a longest distance away from the first surface.

The contact pads have a quadrangular shape. Herein, that means that at least the base of each contact pad is quadrangular and optionally, the body has a quadrangular cross section. By quadrangular is meant that the base has two sets of essentially parallel side surfaces, a first set preferably being essentially perpendicular to a second set of essentially parallel side surfaces.

Essentially parallel means that the distance between the parallel surfaces differs less than 10 percent from one end to the other end of the side surfaces, e.g. 0 percent.

The side surfaces of the first set of side surfaces preferably extend at an angle essentially perpendicular to the side surfaces of the second set of side surfaces. Essentially perpendicular is herein particularly within a range of 80-100 degrees to each other such as 90 degrees to each other.

In the corners where the side surfaces of the first set of side surfaces intersects the side surfaces of the second set of side surfaces, the base may have form sharp pointed corners, or corners with a certain radius of curvature, e.g. a radius in the range of 1-50 percent, such as 2-25 percent, such as 3-15 percent of the shortest length of the side surfaces. All four corners in the quadrangular base may have the same radius of curvature or they may have different radius of curvature.

The side surfaces of the first set of side surfaces may have the same length or a different length compared to the side surfaces of the second set of side surfaces, thereby rendering the quadrangular shape either square or rectangular. In one embodiment, the side surfaces of the first set of side surfaces have a length in the range of 100-150 percent of the length of the side surfaces of the second set of side surfaces, such as 100-125 pct., such as 100-115 pct.

In a preferred embodiment, two neighbouring contact pads have sides facing each other, which sides are at least substantially parallel and with a distance there between of 10-250 μm, such as 50-200 μm, such as 75-150 μm. In this context, the sides have a mutual angle of 15° or less, such as 10° or less, such as 5° or less.

The base of the contact pads may be formed by plane conductive surfaces, and the body of the contact pads may be formed by applying a conductive material onto the plane conductive base e.g. by soldering. The body may have a cone shape with a smoothly rounded tip. In a cross section parallel to the first surface, the body may e.g. have a quadrangular shape or a circular shape or an elliptic shape or an oblong shape with straight side sections connecting two end portions each constituting a half circle, or other shapes.

At least one, or each, sector may be made by drilling a hole in the coating at the location of a corresponding contact pad. This may provide a sector with a circular shape and form a hole or "well" into the coating.

At least one, or each, sector may be made by milling, routing, or planing away a layer of the coating in a specific area, e.g. an area covering more than one contact pad thereby uncovering at least a portion of several or all of the contact pads by one and the same sector.

The coating may form an outer surface of the circuit layer, and at the sector(s), the circuit layer may be joined with an electrically conductive structure.

In one embodiment, the electrically conductive structure is a set of at least one contacting plates, one for each contact pad, and configured to communicate electrical signals with a matching set of contacts in a device.

In one embodiment, the electrically conductive structure is constituted by another circuit layer, where the surface layers are stacked such that the sectors and contact pads of one circuit layer is adjacent the sectors and/or the contact pads of the other circuit layer. By this arrangement, the layers may exchange electrical signals via the adjacent contact pads.

Good electrical contact between the contact pads and the conductive structure may be achieved by a suitable electrical interface arranged between the contact pads and the electrically conductive structure.

In one embodiment, the electrical interface may be constituted by one or more elastically deformable bodies of a conductive material, e.g. conductive rubber. The deformable bodies may e.g. have a spherical shape.

In another embodiment, the electrical interface is constituted by one or more layers of an anisotropic adhesive, glue, or tape which can only conduct electricity in the thickness direction when applied to the sector.

The quadrangular shape of the base may include at least two sides having a length which is larger than the thickness of the substrate, e.g. at least 20, 40, 60, 80 or 100 times larger than the thickness of the substrate.

In one embodiment, the thickness of the substrate is larger than the thickness of the coating, e.g. up to twice as large.

When the contact pads comprise a base essentially in plane with the first surface and a body projecting from the base, the thickness of the coating may be sufficiently larger to cover the body, i.e. larger than the height by which the body projects above the first surface. The projecting height could e.g. be in the range of 300 μm to 400 μm such as 320-370 μm such as in the size of 350 μm. The overlaying part of the coating, i.e. the thickness of the coating on top of the body, may be in the range of 150 to 220 μm, such as in the range of 165-205 μm, such as in the range of 180 μm. In one embodiment, the coating could be 1.1-2.5 times the projecting height.

The thickness of the coating may be at least twice the projecting height of the bodies, and as mentioned before, the bodies may form a circular or an oval or elliptic shape in a plane perpendicular to the first and second surfaces.

The substrate may have a thickness in the range of 400-1000 μm, and the coating may have a thickness in the range of 300-1000 μm. The Total thickness may be in the range of 700-1400 μm, or more preferably in the range of 720-1000 μm.

The sectors and/or contact pads may be arranged in at least one array of at least three sectors and/or contact pads, e.g. in two or three of such arrays thereby forming a matrix of contact pads and/or sectors.

In one embodiment, the coating forms a non-planar outer surface with raised and depressed surface portions and wherein a depressed surface portion forms at least one of the sectors.

In a second aspect, the invention provides an integrated circuit card comprising at least one circuit layer of the kind described above and a conductive structure arranged above the first surface. The circuit layer and the conductive structure may be arranged with the first surfaces facing the conductive structure.

The electrically conductive structure may comprise a set of at least one contacting plates, one for each contact pad, and configured to communicate electrical signals with a matching set of contacts in a device, or the conductive structure may be constituted by another circuit layer, or a human interface such as a switch or a fingerprint sensor. The surface layers could be stacked such that the sectors and contact pads of one circuit layer is adjacent the sectors and/or the contact pads of the other circuit layer. By this arrangement, the layers may exchange electrical signals via the adjacent contact pads.

Good electrical contact between the contact pads and the conductive structure may be achieved by a suitable electrical interface arranged between the contact pads and the electrically conductive structure.

In one embodiment, the electrical interface may be constituted by one or more elastically deformable bodies of a conductive material, e.g. conductive rubber. The deformable bodies may e.g. have a spherical shape.

In another embodiment, the electrical interface is constituted by one or more layers of an anisotropic adhesive or an anisotropic tape which can only conduct electricity in the thickness direction when applied to the sector.

In a third aspect, the invention provides a method of making a circuit layer for an integrated circuit card, the method comprising:
providing an electronic circuit with contact pads having a quadrangular shape;
embedding the electronic circuit in a substrate such that contact pads of the electronic circuit are exposed on a first surface of the substrate;
embedding the first surface and the contact pads in a coating material;
a primary removing step of removing coating material to thereby form sectors of a circular shape uncovering at least a portion of each contact pad.

The method may comprise a secondary removing step of removing a portion of the coating material prior to the primary removing step. Accordingly, a layer of the coating may, firstly be milled away and secondly, wells, e.g. with a circular shape may be drilled in the milled area down to the contact pads.

Particularly, the method may include the step of providing the contact pad with a base and a body extending upwards from the base, and where the base is made with a quadrangular shape.

DETAILED DESCRIPTION

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
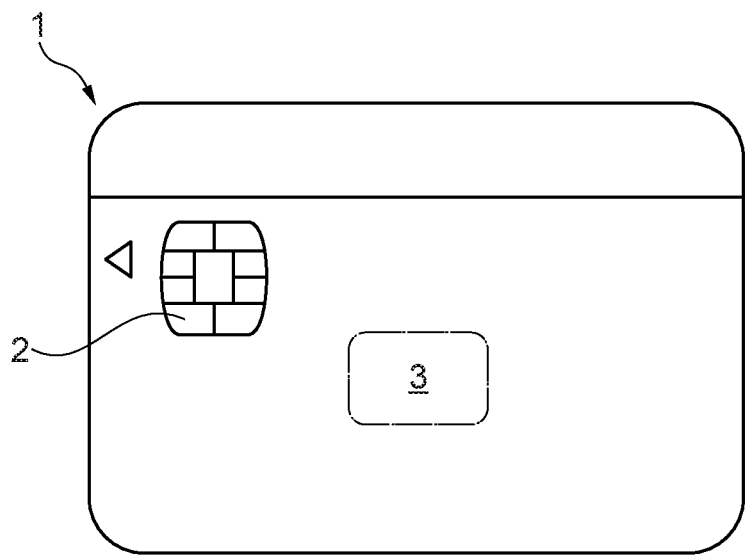
FIG. 1 illustrates an integrated circuit card.

FIG. 1 illustrates an integrated circuit card 1 with a conductive structure 2 arranged in conductive contact with contact pads (not shown) of an integrated circuit illustrated by the dotted line 3. The integrated circuit and contact pads are embedded in the card.

Figure 2:
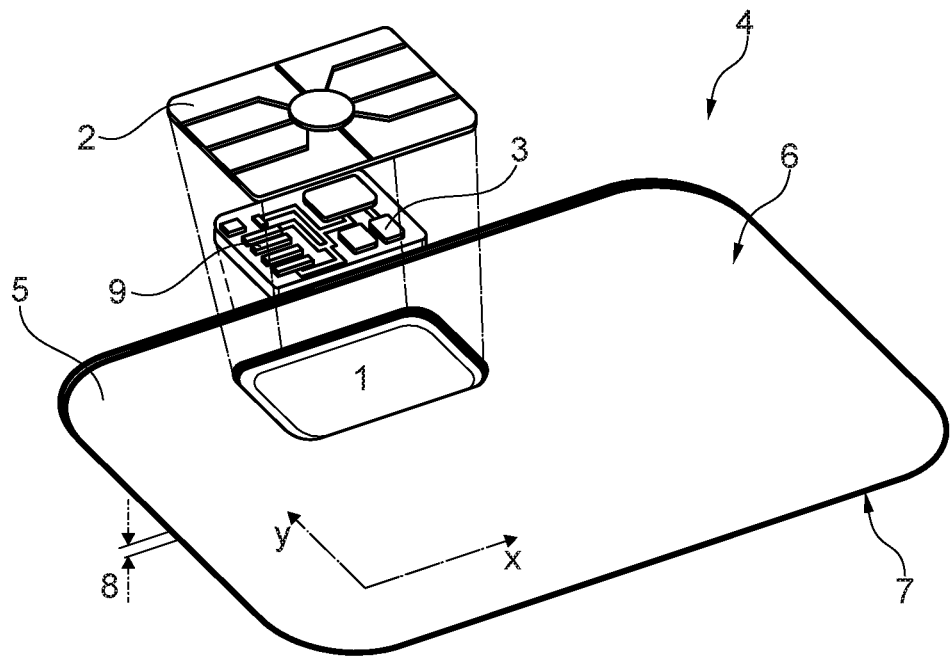
FIG. 2 illustrates a circuit layer.

FIG. 2 illustrates a circuit layer 4 made of polyvinyl chloride and configured to form part of an integrated circuit card of the kind illustrated in FIG. 1. The circuit card comprises a substrate 5 with opposing first and second surfaces 6, 7 defining a thickness direction indicated by the arrow 8. The defined thickness direction is perpendicular to the first and second surfaces. Herein we further refer to the indicated x-direction and y-direction arrows being in a plane parallel with the first and second surfaces.

The circuit layer comprises an electronic circuit 3 which is embedded in the substrate. The electronic circuit comprises a plurality of contact pads 9 which are exposed on the first surface 6. The conductive structure 2, in this embodiment, is arranged directly above, and in electrically conductive contact with the contact pads 9 of the circuit 3. The conductive structure could also be constituted by another electronic circuit.

Figure 3:
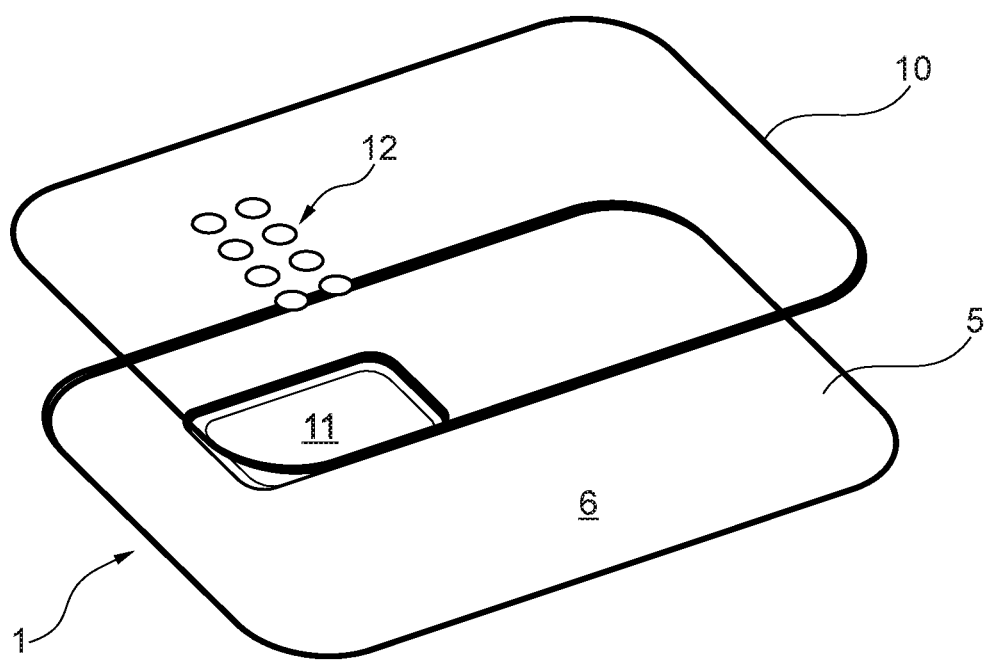
FIG. 3 illustrates the first surface covered with a coating.
Figure 4:
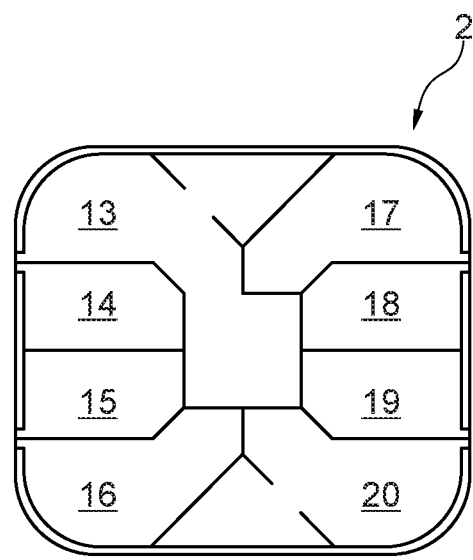
FIG. 4 illustrates the conductive structure with separate contacting plates.

FIG. 3 illustrates that the first surface 6 is covered with a coating 10 which protects the electronic circuit and the contact pads illustrated by the area 11. To provide electrical communication between the contact pads (not shown) and the conductive structure 2, the coating forms circular sectors made by drilling. Each of the sectors 12 corresponds to a contacting plate 13-20 of the conductive structure 2, c.f. FIG. 4. Alternatively, the coating 10 may form one or more larger sector uncovering several or all contact pads.

FIG. 4 illustrates the conductive structure with separate contacting plates 12, 13, 14, 15, 16, 17, 18, 19, 20 which are to communicate with the contact pads of the electronic circuit via the sectors 12, one sector for each contacting plate. The contacting plates match a corresponding contact structure of an electronic device, e.g. a card reader in a phone, or in a system for electronic payment, or the contacting plates or contact pads holds a user input device like a fingerprint sensor or a switch etc.

Figure 5:
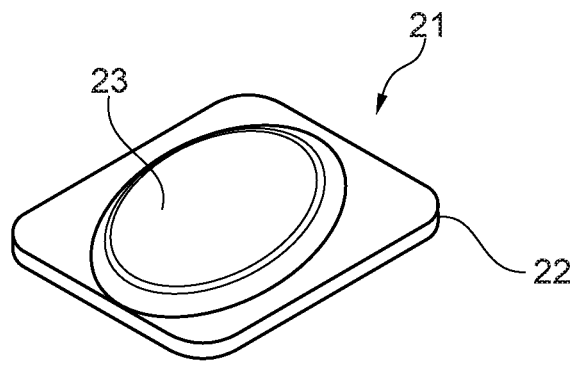
FIG. 5 illustrates a contact pad.

FIG. 5 illustrates a contact pad 21 and particularly shows that each contact pad may comprises a base 22 which is essentially in plane with the first surface. The base is typically a copper or gold plated surface area on the first surface. The base is quadrangular within the definition provided previously, i.e. the corners are rounded, and the sides of each side pair are not necessarily perfectly parallel, and the side pairs are not necessarily perfectly perpendicular.

A body 23 of solder projects from the upper surface of the base. Due to the quadrangular shape of the base, the body becomes non circular and particular, it comes closer to the corners of the base.

FIGS. 6 and 7a, 7b, 7c illustrate the effect of the quadrangular shape of the base. In the cross section of FIG. 6, the sector 24 is offset from the contact pad 25, but since the base of the contact pad is quadrangular, the body of the contact pad is closer to the corner of the base, and sufficient contact can be established via the sector in spite of the offset. The line 26 indicates that the coating 10 is milled down to a first level below the upper surface 27. Subsequently, the sectors 24, 28, 29 are made by drilling further into the coating, or the milling process could also be carried out in a single process all the way to the contact pads, particularly when combined with isotropic tape or glue.

Figure 6:
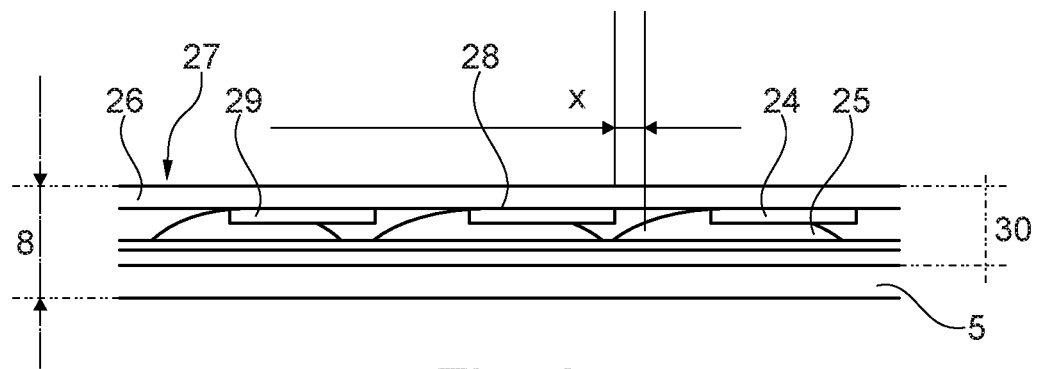
FIGS. 6 and 7a, 7b, 7c illustrate the effect of the quadrangular shape of the base of the contact pad.

In FIG. 6, the coating thickness is indicated by the dotted lines 30 in the right side of the drawing. This indicates that the coating thickness is larger than the projecting height of the bodies of the contact pads.

Figures 7A, 7B, 7C:
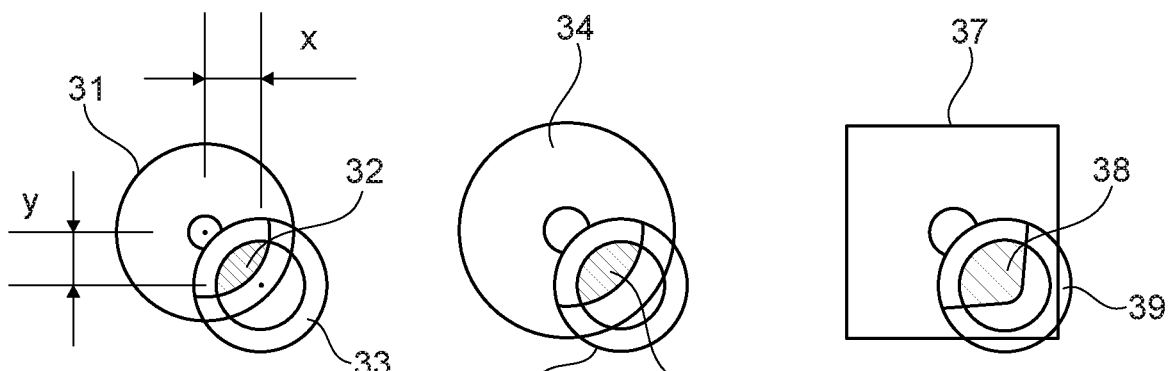

FIG. 7 illustrates the same circuit layer as FIG. 6 but seen from above and visualised through the coating as if the coating was transparent. In all three FIGS. 7a-7c, the offset in x and y direction is relatively high, the combined offset in the 45 degrees angle of the x and y direction offset is therefore even higher. In FIG. 7a, the base 31 of the contact pad is circular, and the overlapping zone 32 between the base 31 and the sector 33 is very small and insufficient for electrical communication. In FIG. 7b, the base 34 of the contact pad is still circular but has a larger diameter. In this situation, the overlapping zone 35 between the body of the contact pad and the sector 36 is still small and insufficient for electrical communication. In FIG. 7c, the base 37 of the contact pad is quadrangular and the overlap 38 between the contact pad and the sector 39 is much larger and sufficient for electrical communication. FIGS. 7a-c thus illustrates the effect of the quadrangular base with identical offset.

Numbered Embodiments

1. A circuit layer (4) for an integrated circuit card (1), the circuit layer comprising a substrate (5) with opposing first and second surfaces (6, 7) defining a thickness direction of the circuit layer in a direction perpendicular to the first and second surfaces, an electronic circuit (3) embedded in the substrate, and a coating (10) covering the first surface, the electronic circuit comprising a plurality of contact pads (9) exposed on the first surface and the coating forming at least one sector (12), each sector uncovering at least a portion of at least one corresponding contact pad, wherein the contact pads have a quadrangular shape.

2. A circuit layer according to embodiment 1, wherein at least one sector has a circular shape.

3. A circuit layer according to any of the preceding embodiments, wherein the quadrangular shape includes at least two sides having a length which is larger than the thickness of the substrate.

4. A circuit layer according to any of the preceding embodiments, wherein the thickness of the substrate is larger than the thickness of the coating.

5. A circuit layer according to any of the preceding embodiments, wherein each contact pad comprises a base (22) essentially in plane with the first surface and a body (23) projecting a projecting height upwards from the base.

6. A circuit layer according to embodiment 5, wherein the thickness of the coating is larger than the projecting height of the bodies.

7. A circuit layer according to embodiment 6, wherein the thickness of the coating is at least twice the projecting height of the bodies.

8. A circuit layer according to any of embodiments 5-7, wherein the bodies forms a circular, oval or elliptical shape in a plane perpendicular to the first and second surfaces.

9. A circuit layer according to any of the preceding embodiments, wherein the substrate has a thickness in the range of 400-1000 μm.

10. A circuit layer according to any of the preceding embodiments, wherein the coating has a thickness in the range of 300-1000 μm.

11. A circuit layer according to any of the preceding embodiments, wherein the sectors and contact pads are arranged in at least one array of at least three sectors and contact pads.

12. A circuit layer according to any of the preceding embodiments, wherein the coating forms a non-planar outer surface with raised and depressed surface portions and wherein at least one of the depressed surface portion forms at least one sector.

13. An integrated circuit card comprising at least one circuit layer according to any of embodiments 1-12, and a conductive structure arranged such that the first surface faces the conductive structure.

14. An integrated circuit card according to embodiment 13, comprising for each sector, an electrical interface arranged between the contact pads and the electrically conductive structure.

15. A method of making a circuit layer for an integrated circuit card, the method comprising:
providing an electronic circuit with contact pads having a quadrangular shape;
embedding the electronic circuit in a substrate such that contact pads of the electronic circuit are exposed on a first surface of the substrate;
embedding the first surface and the contact pads in a coating material;
a primary removing step of removing coating material to thereby form sectors of a circular shape uncovering at least a portion of each contact pad.

16. A method according to embodiment 15, further comprising a secondary removing step of removing a portion of the coating material prior to the primary removing step.

17 A method according to embodiment 15 or 16, where the step of providing the contact pad with a quadrangular shape includes the step of providing a base and a body extending upwards from the base, and where the quadrangular shape is the shape of the base.

The invention claimed is:

1. A circuit layer for an integrated circuit card, the circuit layer comprising:
a substrate with opposing first and second surfaces defining a thickness direction of the circuit layer in a direction perpendicular to the first and second surfaces,
an electronic circuit embedded in the substrate, and
a coating covering the first surface,
wherein the electronic circuit comprises a plurality of contact pads exposed on the first surface and the coating forming at least one sector, each sector uncovering at least a portion of at least one corresponding contact pad, wherein the contact pads have a quadrangular shape.

2. A circuit layer according to claim 1, wherein at least one sector has a circular shape.

3. A circuit layer according to claim 1, wherein the quadrangular shape includes at least two sides having a length which is larger than a thickness of the substrate.

4. A circuit layer according to claim 1, wherein a thickness of the substrate is larger than a thickness of the coating.

5. A circuit layer according to claim 1, wherein each contact pad comprises a base essentially in plane with the first surface and a body projecting a projecting height upwards from the base.

6. A circuit layer according to claim 5, wherein a thickness of the coating is larger than the projecting height of the bodies.

7. A circuit layer according to claim 6, wherein the thickness of the coating is at least twice the projecting height of the bodies.

8. A circuit layer according to claim 5, wherein the bodies forms a circular, oval or elliptical shape in a plane perpendicular to the first and second surfaces.

9. A circuit layer according to claim 1, wherein the sectors and contact pads are arranged in at least one array of at least three sectors and contact pads.

10. A circuit layer according to claim 1, wherein the coating forms a non-planar outer surface with raised and depressed surface portions and wherein at least one of the depressed surface portion forms at least one sector.

11. An integrated circuit card comprising at least one circuit layer according to claim 1, and a conductive structure arranged such that the first surface faces the conductive structure.

12. An integrated circuit card according to claim 11, comprising for each sector, an electrical interface arranged between the contact pads and the conductive structure.

13. A method of making a circuit layer for an integrated circuit card, the method comprising:

providing an electronic circuit with contact pads having a quadrangular shape;

embedding the electronic circuit in a substrate such that contact pads of the electronic circuit are exposed on a first surface of the substrate;

embedding the first surface and the contact pads in a coating material;

a primary removing step of removing coating material to thereby form sectors of a circular shape uncovering at least a portion of each contact pad.

14. A method according to claim 13, further comprising a secondary removing step of removing a portion of the coating material prior to the primary removing step.

15. A method according to claim 13, where the step of providing the contact pad with a quadrangular shape includes the step of providing a base and a body extending upwards from the base, and where the quadrangular shape is the shape of the base.

\* \* \* \* \*